United States Patent [19]
Jennings et al.

[11] Patent Number: 5,652,294
[45] Date of Patent: Jul. 29, 1997

[54] SINGLE COMPONENT, AQUEOUS, POLYUREA COATING COMPOSITIONS

[75] Inventors: Robert E. Jennings, New Sewickley Twp.; Soner Kilic, Hampton Twp.; Masayuki Nakajima, Franklin Park Boro, all of Pa.

[73] Assignee: PPG Industries, Inc., Pittsburgh, Pa.

[21] Appl. No.: 576,525

[22] Filed: Dec. 21, 1995

[51] Int. Cl.$^6$ .............................. C08J 3/00; C08K 3/20; C08L 75/00
[52] U.S. Cl. .............. 524/507; 524/591; 524/839; 524/840; 525/123; 525/455
[58] Field of Search ............................... 524/591, 839, 524/840, 507; 525/123, 455

[56] References Cited

U.S. PATENT DOCUMENTS

| | | | |
|---|---|---|---|
| 5,075,370 | 12/1991 | Kubitza et al. | 524/591 |
| 5,225,505 | 7/1993 | Wiegert | 526/245 |
| 5,342,878 | 8/1994 | Das et al. | 524/558 |
| 5,367,017 | 11/1994 | Rosthauser et al. | 525/589 |

*Primary Examiner*—Patrick Niland
*Attorney, Agent, or Firm*—Dennis G. Millman

[57] ABSTRACT

Disclosed are aqueous, single-component coating compositions that contain as the primary binder component a polyurea which is the reaction product of:

(a) a polymeric component containing at least one polymer based on olefinically unsaturated compounds and containing isocyanate-reactive groups comprising primary amino groups and/or secondary amino groups, with the optional additional presence of hydroxyl groups; and (b) a polyisocyanate component containing polyisocyanate groups in amounts sufficient to provide an NCO/NH equivalent ratio of about 0.5:1 to 1:1.

12 Claims, No Drawings

SINGLE COMPONENT, AQUEOUS, POLYUREA COATING COMPOSITIONS

BACKGROUND OF THE INVENTION

This invention relates to aqueous coating compositions based on polyurea polymer dispersions formed from isocyanates and amino acrylates. More particularly, it relates to providing such compositions in single package form while avoiding bulk gelation.

It is generally desirable to use water based coatings instead of organic solvent based coatings for the sake of environmental considerations. However, the use of water instead of organic solvents in coating compositions based on polyisocyanates containing free isocyanate groups has been hampered by the fact that isocyanate groups react not only with isocyanate-reactive groups in the intended crosslinking reaction, but also with the water. Therefore, in a composition including a polyisocyanate, isocyanate-reactive groups, and water, the isocyanate/water reaction takes place with formation of urea and carbon dioxide. This reaction not only fails to achieve the intended crosslinking of the isocyanate reactive groups, but also results in gassing or foaming of the composition due to the formation of carbon dioxide. Various attempts have been made in the prior art to stabilize aqueous isocyanate compositions against the undesired side reaction with water.

It was disclosed in U.S. Pat. No. 5,075,370 that it is possible to produce aqueous, two-component polyurethane coating compositions by using neutralized, acid group-containing polyhydroxy polymers, i.e. polyhydroxypolyacrylates, as dispersing agents for polyisocyanates containing free isocyanate groups. The polyisocyanates containing free isocyanate groups are emulsified in the aqueous, anionic polymer solution or dispersion. The coating compositions according to that patent are said to have a pot life of several hours and cure by way of isocyanate/hydroxyl group reaction to form polyurethane linkages.

In commonly owned, copending U.S. patent application Ser. No. 08/357,488 filed December 16, 1994, there is disclosed and claimed two-component waterborne coating compositions based on amino-acrylates and isocyanates that are relatively free from side reactions with water and which react to form polyureas. It would be desirable to have such a composition available in a stable, single package form to avoid the inconvenience of mixing the two ingredients at the location of use. However, mixing a polyamine with a polyisocyanate in a single package normally yields relatively rapid reaction at room temperature, such that gelation occurs and the mixture soon becomes unusable as a coating composition. Therefore, it has been considered expedient to sell such coatings as two separate packages that are mixed immediately prior to use.

SUMMARY OF THE INVENTION

The present invention is directed to aqueous, single-package coating compositions that contain as the primary binder component polyureas which are the result of the admixture of amino polymers and isocyanates. The amino polymers comprise the polymerization products of olefinically unsaturated compounds, including compounds containing primary amine groups and/or secondary amine groups. Optionally, other isocyanate-reactive groups, such as hydroxyl groups, may additionally be present in the monomers from which the amino polymer is synthesized. Preferably, the amino polymer is an amino acrylate.

The polyisocyanate compounds that are mixed with the amino polymer contain a plurality of isocyanate groups. Surprisingly, it has now been found that under certain circumstances such a mixture can be stable and substantially avoid bulk gelation in a single package. At the same time, these compositions dry at a very rapid rate when applied onto a substrate. Accordingly, they are particularly useful as primer-surfacer coatings for automobiles, for example, because they can be sanded within a short time after application.

In the stable single-package compositions of the present invention the relative amounts of the polyisocyanate and the amino polymer are such that the NCO/NH equivalent ratio is less than 1:1. Preferably the ratio is also at least 0.5:1. If the amino polymer also includes hydroxyl groups as is optionally permitted, these ratios relate to the NCO/(NH+OH) equivalent ratio.

The use of polyisocyanates having no more than two functional NCO groups has also been found to be important to the present invention. With greater number of isocyanate groups per molecule, it is difficult to avoid premature gelation. In the preferred embodiments, higher functional isocyanates are used, but the excess isocyanate groups are defunctionalized by means of reaction with a compound containing an isocyanate-reactive group such as an amine or a hydroxyl group. It is further advantageous to use as the defunctionalizing agent a compound that also contains non-isocyanate groups that have the capability of contributing to crosslinking of the coating composition during drying (e.g., silanes).

To make the compositions of the present invention, first the amino polymer is solubilized in water by acid neutralization of the amino groups. Then the polyisocyanate is emulsified in the aqueous dispersion of the amino polymer, with or without the aid of a surfactant. This initiates reaction of the polyisocyanate with the amino polymer to form urea linkages. It is also believed that some reaction of the polyisocyanate with water occurs. Surprisingly, it was discovered that gelation of these mixed components can be avoided under the practice of the present invention, thus permitting the coating to be supplied in a single package. Not only is the mixture surprisingly stable, but it also dries very rapidly when applied onto a substrate, whereupon coalescence of the polymer particles is initiated by evaporation of the liquid medium. The rapid dry rate lends this coating to use, for example, as a primer surfacer in automotive applications since the ability to sand soon after applying the coating is desirable in such application.

DETAILED DESCRIPTION

The amino polymers contained in the coatings of the present invention are synthesized in the known manner from olefinically unsaturated monomers containing primary and/or secondary amino groups. These amino groups serve both as sites for partial neutralization by an acid to form cationic aqueous dispersions as well as curing sites for reaction with the isocyanate to form urea linkages. Optionally, the amino polymers may also include hydroxyl groups, which upon curing with the isocyanate groups form urethane linkages. The amino group-containing polymers have a number average molecular weight ($M_n$), as determined by gel permeation chromatography, of about 500 to 50,000, preferably about 1,000 to 10,000. The amine content of the amino polymer is preferably 0.05 to 2.70 milliequivalents per gram, most preferably 0.25 to 1.62 milliequivalents per gram. After copolymerization, the amino groups are at least partially neutralized with an acid for inversion into the aqueous medium as a cationic polymer. In a particularly preferred embodiment, the cationic groups are secondary amino groups that have been neutralized with acetic acid. The amino polymer component of the coating compositions of the present invention are provided in an aqueous medium in amounts of 10 to 50 percent by weight resin solids, preferably 20 to 40 percent by weight, and has a pH value of 4 to 6, preferably 5 to 5.5. Depending upon the molecular weight of the polymers and their content of cationic groups, the aqueous systems containing the polymers may be either colloidal dispersions or molecular solutions.

The amino groups contained in the copolymer are used for the purpose of salt formation by acid groups that either fully or partially neutralize the amino groups. In general, the amino comonomers are used in quantities of about 1 to 50 percent by weight, preferably in quantities of about 5 to 30 percent by weight, based on the total weight of the monomers used.

In principle, suitable amino monomers to be used in the copolymerization of the amino polymers may be any olefinically unsaturated, polymerizable compounds which contain at least one primary or secondary amine group, e.g.: amino acrylates and amino methacrylates such as tert-butylaminoethyl methacrylate or meta-isopropenyl-α,α-dimethylbenzylamine. Amine groups can also be obtained by the reaction of acid polymers with aziridines such as ethylene imine, or by the reaction of epoxy and blocked ketimines, as well as other techniques known for adding amine functionality to polymers.

Monomers containing hydroxyl groups are not required in the present invention, but when used, may be included in the monomer mixture in such quantities that the hydroxyl group-containing comonomers are used in quantities of about 0 to 30 percent by weight, preferably 0 to 10 percent by weight based on the total weight of monomers used to copolymerize the amino polymer. Suitable monomers containing hydroxyl groups include, in particular, hydroxyalkyl esters of acrylic acid or methacrylic acid preferably containing 2 to 4 carbon atoms in the alkyl radical such as 2-hydroxyethyl acrylate or methacrylate, 2- or 3-hydroxypropyl acrylate or methacrylate, the isomeric hydroxybutyl acrylates or methacrylates and mixtures of such monomers.

The third group of olefinically unsaturated monomers which may be used for the copolymerization of the amino polymer are olefinically unsaturated compounds which contain neither amino nor hydroxyl groups. These compounds include esters of acrylic acid or methacrylic acid containing from 1 to 18, preferably from 1 to 8, carbon atoms in the alcohol radical, such as methyl acrylate, ethyl acrylate, isopropyl acrylate, n-propyl acrylate, n-butyl acrylate, 2-ethylhexyl acrylate, n-stearyl acrylate, and tertiary amine containing acrylates or methacrylates, and the methacrylates corresponding to these acrylates. Also included are styrene, alkyl substituted styrenes, acrylonitrile, methacrylonitrile, vinyl acetate, vinyl stearate and mixtures of such monomers. The monomers of this third group are used in quantities of 50 to 90 percent by weight, preferably about 40 to 80 percent by weight, based on the total weight of the monomers used.

The amino polymers may be produced by standard polymerization processes. The polymers are preferably produced in organic solvent. The polymerization reaction is free radically initiated when the monomer mixture is added together with an initiator mixture over a period of about 1 to 10 hours, preferably about 3 to 6 hours, at reaction temperature. Thereafter more initiator may optionally be added to take the polymerization to a conversion of at least 99 percent.

Suitable solvents for the amino polymer are characterized by their solubility toward the polymer and their ability to be azeotropically distilled off for inversion to the aqueous medium. These may include alcohols such as ethanol, propanol, and butanol; aromatic hydrocarbons such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane and ethyl glycol ether; ketones such as acetone and methyl ethyl ketone; halogen-containing solvents such as methylene chloride and trichloromonofluoroethane; and mixtures of these solvents.

The polymerization may be initiated by initiators commercially available for this purpose. In general, the copolymerization reaction takes place at temperatures in the range previously set forth, preferably at a temperature of about 50° to 160° C. under atmospheric pressure. The exact polymerization temperature is determined by the type of initiator and solvent used. The initiators are used in quantities of about 0.05 to 10 percent by weight, based on the total quantity of monomers. Suitable initiators include aliphatic azo compounds such as azoisobutyronitrile and peroxides such as dibenzoyl peroxide, t-butyl perpivalate, t-butyl per-2-ethylhexanoate, t-butyl perbenzoate, t-butyl hydroperoxide, di-t-butyl peroxide, cumene hydroperoxide and dicyclohexyl and dibenzyl peroxydicarbonate.

The molecular weight of the polymers may be regulated by standard regulators such as n-dodecylmercaptan, diisopropyl xanthogene disulfide, di(methylene-trimethylolpropane)-xanthogene disulfide and thioglycol. They are added in quantities of up to about 10 percent by weight, based on the monomer mixture.

On completion of polymerization, the amino polymers are converted into an aqueous solution or dispersion. An acid is introduced into the polymerization solution, followed by addition of water. Then the organic solvent is removed by azeotropic distillation. Fugitive acids are preferred for the neutralization, i.e., those that will escape from the coating as it dries, thereby avoiding interference with the drying. Fugitive acids are generally organic acids, preferred among which are acetic acid, propionic acid, lactic acid, and trifluoroacetic acid. However, within the broad aspects of the invention, mineral acids could also be employed, such as carbonic acid, phosphoric acid and sulfuric acid, of which fugitive carbonic acid is preferred. Other organic and mineral acids are well known in the art and may be used for neutralization in the present invention.

The polyisocyanate employed in the coating compositions of the present invention may be any polyisocyanate containing aliphatically, cycloaliphatically, araliphatically and/or aromatically bound isocyanate groups which are liquid at room temperature. The polyisocyanate may be rendered compatible with the aqueous composition in various ways, including modifying the polyisocyanate itself to be water dispersible or water reducible. An illustration of such an approach is Example 5 herein. However, the preferred embodiments employed polyisocyanates in combination with a separate emulsifier. The polyisocyanate used as a starting material in the present invention is preferably a polyisocyanate compound or mixture of polyisocyanate compounds exclusively containing aliphatically and/or cycloaliphatically bound isocyanate groups and having an average NCO functionality of about 2.0 to 5.0 per molecule.

For use in the coating composition, however, the isocyanate functionality is preferably reduced to an average of no more than 2.0 per molecule as will be described hereinafter. If necessary, the polyisocyanates may be used in admixture with small quantities of inert solvents to reduce the viscosity. However, the maximum quantity in which such a solvent is used is such that the coating compositions contain at most 20 percent by weight of solvent, based on the quantity of water and any solvent that may still present in the polymer dispersions or solutions. Suitable solvents for the polyisocyanates include aromatic hydrocarbons such as solvent naphtha, acetates, or the solvents set forth as suitable for the polymerization of the amino polymer, with the exclusion of alcoholic solvents.

Suitable polyisocyanates include those containing aromatically or (cyclo)aliphatically bound isocyanate groups, (cyclo)aliphatic polyisocyanates being particularly preferred. Particularly suitable are polyisocyanates based on 1,6-hexamethylene diisocyanate, 1-isocyanato-3,3,5-trimethyl-5-isocyanatomethyl cyclohexane (IPDI) and/or bis-(isocyanatocyclohexyl)-methane, particularly those based on 1,6-hexamethylene diisocyanate. Other suitable polyisocyanates based on these diisocyanates may include the biuret, urethane, uretdione and/or isocyanurate derivatives of these diisocyanates which, after their production, have been freed in the known manner, preferably by distillation, from excess starting diisocyanate to a residual content of less than 0.5 percent by weight. Aliphatic polyisocyanates for use in accordance with the invention include biuret polyisocyanates based on hexamethylene which are based on mixtures of N,N',N"-tris-(6-isocyanatohexyl)biuret with small quantities of its higher homologs. These polyisocyanates may be obtained by the processes according to U.S. Pat. Nos. 3,124,605; 3,358,010; 3,903,126; 3,903,127 or 3,976,622. Also preferred are the cyclic trimers of 1,6-hexamethylene diisocyanate corresponding to the criteria mentioned above which may be obtained in accordance with U.S. Pat. No. 4,324,879 and which are based on N,N'N"-tris-(6-isocyanatohexyl)-isocyanurate in admixture with small quantities of its higher homologs. The aromatic polyisocyanates which may also be used in accordance with the invention, but are less preferred, are based on 2,4-diisocyanatotoluene or commercial mixtures thereof with 2,6-diisocyanatotoluene or based on 4,4'-diisocyanatodiphenylmethane or mixtures thereof with its isomers and/or higher homologs. Aromatic polyisocyanates of this type include the urethane isocyanates obtained by the reaction of excess quantities of 2,4-diisocyanatotoluene with polyhydric alcohols such as trimethylolpropane and subsequent removal of the unreacted diisocyanate excess by distillation. Other aromatic polyisocyanates include the trimers of the previously mentioned monomeric diisocyanates which have also been freed from excess monomeric diisocyanates, preferably by distillation, after their production.

Although polyisocyanates having more than two functional isocyanate groups are preferred as starting materials, it has been found to be desirable to partially react some of the isocyanate functionality prior to adding the polyisocyanate to the coating compositions of the present invention. With isocyanate functionality above 2, it is difficult to avoid premature gelation of the coating composition. The excess isocyanate groups are defunctionalized by reaction with a compound containing an isocyanate-reactive group such as an amine or a hydroxyl group. Optionally, the defunctionalizing compound may also contain groups other than isocyanates that have the capability of contributing to crosslinking of the coating composition during curing. One type of such compounds are amino silanes.

To prepare the ready-to-use coating compositions, the polyisocyanate component is emulsified in the aqueous dispersion of the amino polymer. The dissolved or dispersed polymer simultaneously serves as an emulsifier for the polyisocyanate added. Optionally, dispersing the polyisocyanate may be assisted by a separate surfactant. Mixing may be carded out by simple stirring at room temperature. The quantity of the polyisocyanate component is selected to provide an NCO:NH equivalent ratio {or NCO:(NH+OH) equivalent ratio if hydroxyl functionality is present}, based on the isocyanate groups of component (b) and the primary and secondary amino groups and hydroxyl groups of component (a), of less than 1:1, preferably at least 0.5:1. The ratio depends upon the particular isocyanate used. For the purposes of the present invention, a primary amine group is considered as an equivalent of two, and a secondary amino group is considered an equivalent of one. Thus, NH in the ratios herein represents equivalents of amine hydrogen.

Additives typically used in coating technology may be incorporated into the coating composition of the present invention. The additives include foam inhibitors, leveling aids, pigments, dispersion aids for pigments, etc., and are preferably introduced initially into component (a).

The coating compositions according to the invention thus obtained are suitable for virtually any applications where high performance is desired with rapid drying. They are particularly useful for coating of metal surfaces and various plastic surfaces as automotive primer-surfacers (i.e., a coating typically applied directly onto an electrodeposited primer before a colored coating is applied.

The invention is further illustrated but is not intended to be limited by the following examples in which all parts and percentages are by weight unless otherwise specified.

EXAMPLE 1

The following initial charge and feeds were used in the preparation of aqueous secondary amine and hydroxyl functional acrylic polymer via solution polymerization technique.

| Ingredients | Parts by Weight |
| --- | --- |
| Initial Charge | |
| Isopropanol | 130.0 |
| Feed 1 | |
| Isopropanol | 113.0 |
| n-Butyl acrylate | 69.2 |
| Methyl methacrylate | 153.0 |
| Tert-butylaminoethyl methacrylate | 73.0 |
| Styrene | 69.2 |
| VAZO ® 67[1] | 18.2 |
| Feed 2 | |
| Glacial acetic acid | 17.7 |
| Feed 3 | |
| Deionized water | 1085.0 |

[1] 2,2'-Azobis(2-methylbutanenitrile) initiator commercially available from E. I. du Pont de Nemours and Company, Wilmington, Delaware.

The initial charge was heated in a reactor with agitation to reflux temperature (80° C.). Then Feed 1 was added in a continuous manner over a period of 3 hours. At the completion of Feed 1, the reaction mixture was held at reflux for 3 hours. The resultant acrylic polymer had a total solids content of 61.7 percent determined at 110° C. for one hour and number average molecular weight of 4792 as determined by GPC using polystyrene as standard. Thereafter, Feed 2 was added over five minutes at room temperature with agitation. After the completion of the addition of Feed 2, Feed 3 was added over 30 minutes while the reaction mixture was heated for azeotropic distillation of isopropanol. When the distillation temperature reached 99° C., the distillation continued about one more hours and then the reaction mixture was cooled to room temperature. The total distillate collected was 550.6 grams. The final aqueous dispersion had a solid content of 32.6 percent determined at 110° C. for one hour, and pH of 5.25.

EXAMPLE 2

The following initial charge and feeds were used in the preparation of aqueous secondary amine functional acrylic polymer via solution polymerization technique.

| Ingredients | Parts by Weight |
|---|---|
| Initial Charge | |
| Isopropanol | 650.0 |
| Feed 1 | |
| Isopropanol | 565.0 |
| n-Butyl acrylate | 273.5 |
| Methyl methacrylate | 783.5 |
| Tert-butylaminoethyl methacrylate | 364.5 |
| Styrene | 401.0 |
| VAZO-67 | 91.0 |
| Feed 2 | |
| Glacial acetic acid | 88.5 |
| Feed 3 | |
| Deionized water | 5425.0 |

The initial charge was heated in a reactor with agitation to reflux temperature (81° C.). Then Feed 1 was added in a continuous manner over a period of 3 hours. At the completion of Feed 1, the reaction mixture was held at reflux for 3 hours. The resultant acrylic polymer had a total solids content of 59.8 percent determined at 110° C. for one hour and number average molecular weight of 4833 as determined by gel permeation chromatography (GPC) using polystyrene as standard.

Following the polymerization, Feed 2 was added over 10 minutes at room temperature with agitation. After the completion of Feed 2, Feed 3 was added over 15 minutes. Then the reaction mixture was heated for azeotropic distillation of isopropanol. When the distillation temperature reached 99°–100° C., the distillation continued two more hours and then the reaction mixture was cooled to room temperature. The total distillate collected was 2545 grams. After filtration the final aqueous dispersion had a solid content of 31.5 percent and pH of 5.32.

EXAMPLE 3

The aqueous secondary amine functional acrylic polymer was prepared according to the method of Example 1. The resultant dispersion had a total solids content of 29.7 percent determined at 110° C. for one hour and a pH of 5.25.

EXAMPLE 4

The following initial charge and feeds were used in the preparation of an aqueous secondary amine functional acrylic polymer via solution polymerization.

| Ingredients | Parts by Weight |
|---|---|
| Initial Charge | |
| EXXATE ® 900[1] | 718.2 |
| Feed 1 | |
| EXXATE 900 | 792.6 |
| VAZO-67 | 254.4 |
| Feed 2 | |
| n-Butyl acrylate | 762.0 |
| Methyl methacrylate | 2179.2 |
| Tert-butylaminoethyl methacrylate | 1012.8 |
| Styrene | 1116.0 |
| Feed 3 | |
| EXXATE 900 | 72.0 |
| Feed 4 | |
| EXXATE 900 | 72.0 |

[1]$C_9$ alkyl acetate available from Exxon Chemical Company.

The initial charge was heated in a reactor with agitation to a temperature of 140° C. under a nitrogen blanket. Feed 1 and Feed 2 were added in a substantially continuous manner over a period of 3 hours. At the completion of Feed 1 and 2, the addition funnels were rinsed with Feeds 3 and 4, and the reaction mixture was held at reflux for 3 hours. The resultant acrylic polymer had a total solids content of 77.1 percent determined at 110° C. for one hour.

Following the polymerization, 3,100 grams of the prepared polymer solution was placed in a reaction vessel suitable for vacuum distillation and heated to about 150° C. When the temperature reached 150° C., the distillation of EXXATE-900 was started by applying a vacuum. After 2 hours of distillation under 24 to 29 inches of mercury vacuum at 148° to 150° C., 319.3 grams of total distillate was collected.

The distilled polymer (523.6 grams) at 150° C. was added to 1,018.6 grams of deionized water containing 26.2 grams of glacial acetic acid at 80° C. under agitation over 20 minutes. The dispersion was cooled to room temperature and filtered through a 10 micron filter bag. The resultant dispersion had a total solids content of 28.4 percent determined at 110° C. for one hour and a pH of 4.91.

In the following example there is described the preparation of a water-reducible, cationic isocyanate resin that may be used to cross-link the amino polyacrylates of the examples above.

EXAMPLE 5

Isophorone diisocyanate (176.8 grams, 1.6 equivalents) and DESMODUR W (104.8 grams, 0.8 equivalents) were placed in a one liter, four-neck, round bottom flask. The flask was heated to 60° C. and a nitrogen blanket was applied throughout the reaction. Propoxylated n-methyl diethanolamine (126.7 grams, 0.54 OH equivalents, 0.26 amine equivalents) and methanesulfonic acid (25.0 grams, 0.26 equivalents) were carefully mixed and the resulting mixture was slowly added to the flask at 60° C. through an additional funnel. The flask was kept at 60° C. until the isocyanate equivalent weight reached 224. The propoxylated n-methyl diethanolamine was the product of the reaction of n-methyl ethanolamine (1 mole) with propylene oxide (7 moles).

The amino acrylate resins of Examples 1, 2, 3 and 4 were used to formulate single package aqueous coating compositions in combination with various isocyanates as set forth in the following Examples A through D. All were stable against premature gelation and dried very rapidly. In Example A the isocyanate was self-dispersing, so no emulsifier was needed. Example B used a combination of a tri-functional isocyanate and a nonionic emulsifier. Example C used a combination of a di-functional isocyanate and a nonionic emulsifier. Example D used a combination of a partially defunctionalized isocyanate and a nonionic emulsifier.

EXAMPLE A

| Component | Weight Percent |
| --- | --- |
| Grind Paste: | |
| Amino acrylate of Example 1 | 16.821 |
| RAVEN ® 410[1] | 0.035 |
| MICROTALC ® MP-12-50[2] | 7.991 |
| BARIMITE ® XF[3] | 8.254 |
| TI-PURE ® R902-38[4] | 9.395 |
| SOLSPERSE ® 27000[5] | 0.307 |
| DEE FO ® 97.3[6] | 0.053 |
| Deionized water | 4.560 |
| DSX-1514 ®[7] | 0.292 |
| Let Down: | |
| PROGLYDE ® DMM[8] | 0.117 |
| n-Propanol[9] | 0.030 |
| Amino acrylate of Example 1 | 18.965 |
| EXXATE ® 900[10] | 3.029 |
| Deionized water | 22.419 |
| Isocyanate: | |
| Cationic isocyanate of Example 5 | 3.324 |
| EXXATE 900 | 0.542 |
| Deionized water | 3.866 |

EXAMPLE B

| Component | Weight Percent |
| --- | --- |
| Grind Paste: | |
| Amino acrylate of Example 2 | 17.017 |
| RAVEN 410 | 0.036 |
| MICROTALC MP-12-50 | 8.271 |
| BARIMITE XF | 8.543 |
| TI-PURE R902-38 | 9.725 |
| SOLSPERSE 27000 | 0.318 |
| DEE FO 97-3 | 0.091 |
| Deionized water | 6.350 |
| Butyl CELLOSOLVE ® acetate[11] | 0.545 |
| DSX-1514 | 0.303 |
| Let Down: | |
| PROGLYDE DMM | 0.121 |
| n-Propanol | 0.031 |
| Amino acrylate of Example 2 | 17.178 |
| EXXATE 900 | 1.909 |
| Deionized water | 24.994 |
| Isocyanate: | |
| DESMODUR ® N 3200[12] | 1.834 |
| Emulsifier[13] | 0.825 |
| EXXATE 900 | 1.909 |

EXAMPLE C

| Component | Weight Percent |
| --- | --- |
| Grind Paste: | |
| Amino acrylate of Example 3 | 19.108 |
| RAVEN 410 | 0.038 |
| MICROTALC MP-12-50 | 8.553 |
| BARIMITE XF | 8.835 |
| TI-PURE R902-38 | 10.056 |
| EXXATE 900 | 2.123 |
| SOLSPERSE 27000 | 0.329 |
| DEE FO 97-3 | 0.094 |
| Deionized water | 3.496 |
| DSX-1514 | 0.313 |
| Let Down: | |
| PROGLYDE DMM | 0.117 |
| n-Propanol | 0.157 |
| Amino acrylate of Example 3 | 26.975 |
| EXXATE 900 | 2.444 |
| Deionized water | 15.836 |
| Isocyanate: | |
| Isophorone diisocyanate[14] | 1.233 |
| Emulsifier[15] | 0.411 |

EXAMPLE D

| Component | Weight Percent |
| --- | --- |
| Grind Paste: | |
| Amino acrylate of Example 4 | 22.608 |
| RAVEN 410 | 0.042 |
| MICROTALC MP-12-50 | 9.532 |
| BARIMITE XF | 9.846 |
| TI-PURE R902-38 | 11.208 |
| SOLSPERSE 27000 | 0.367 |
| DEE FO 97-3 | 0.105 |
| Deionized water | 4.948 |
| DSX-1514 | 0.349 |
| Let Down: | |
| n-Propanol | 0.175 |
| Deionized water | 6.285 |
| Amino acrylate of Example 4 | 14.192 |
| EXXATE 900 | 3.142 |
| Isocyanate: | |
| DESMODUR ® N 3400[16] | 3.228 |
| SILQUEST ® Y-9669[17] | 1.444 |
| Emulsifier | 2.055 |

[1]RAVEN ® 410 - Carbon black pigment available from Cities Service Co., Columbian Div., Akron, Ohio.
[2]MICROTALC ® MP-12-50 - Magnesium silicate hydrate available from Whittaker, Clark, & Daniel Inc., South Plainfield, New Jersey.
[3]BARIMITE XF ® - Barium sulfate available form Cyprus Industrial Mineral Co., Cartersville, Georgia.
[4]TI-PURE ® R902-38 - Titanium dioxide pigment available from E. I. du Pont de Nemours & Co., Wilmington, Delaware.
[5]SOLSPERSE ® 27000 - Hyperdispersant available from ICI Surfactants, Wilmington, Delaware.
[6]DEE FO ® 97-3 - Defoamer available form Ultra Additive Inc., Paterson, New Jersey.
[7]DSX-1514 ® - Thickener available from Henkel, Kankakee, Illinois.
[8]PROGLYDE ® DMM - Solvent, dipropylene glycol dimethoxy ether, available from Dow Chemical U.S.A., Chemicals and Performance Products Dept., Midland, MI.
[9]n-Propanol - Solvent available from Eastman Chemical Products, Inc., Kingsport, Tennessee.
[10]EXXATE ® 900 - $C_9$ alkyl acetate solvent available from Exxon Chemical Co., Houston, Texas.
[11]Butyl CELLOSOLVE Acetate - Solvent available from Eastman Chemical Products, Inc., Kingsport, Tennessee.

EXAMPLE D

| Component | Weight Percent |
| --- | --- |

[12]DESMODUR® N 3200 - A hexamethylene diisocyanate biuret available from Bayer Corporation, Pittsburgh, Pennsylvania.

[13]Emulsifier - a nonionic surfactant having residual isocyanate functionality made by the reaction of 75 percent T-1890 (an isophorone diisocyanate available from Huls America, Piscataway, New Jersey) and 25 percent CARBOWAX® 750ME (a monofunctional polyether surfactant from Union Carbide Chemicals and Plastic Co., Charleston, West Virginia) in methyl ethyl ketone and PROGLYDE® DMM (dipropylene glycol dimethoxy ether, available from Dow Chemical Co., Midland, Michigan).

[14]Isophorone diisocyanate - Monomeric, aliphatic isocyanate available from Bayer Corporation, Pittsburgh, PA.

[15]Emulsifier - a nonionic surfactant having no residual isocyanate functionality made by the reaction of 33.3 weight percent T-1890, 11.1 weight percent CARBOWAX® 750ME, and 55.6 weight percent SOLVACTANT® DMH-7, all supplied at 100% resin solids.

[16]DESMODUR® N 3400 - A trimer isocyanate available from Bayer Corporation, Pittsburgh, Pennsylvania.

[17]SILQUEST® Y-9669 - Amino-silane available from OSi Specialties, Inc., Sistersville, West Virginia.

[18]Emulsifier - a nonionic surfactant having no residual isocyanate made by the reaction of 49.46 weight percent T-1890, 16.49 weight percent CARBOWAX® 750ME, 17.03 weight percent diethylethanolamine, and 17.03 weight percent SOLVACTANT® DMH-7 (a nonionic surfactant available from Union Carbide), in methyl ethyl ketone and EXXATE® 900.

The coating compositions of Examples A through D were prepared in the following manner. In a grinding vessel under high speed agitation with a Cowles blade, the pigments were sifted into the other components of the grind paste (except the thickener). After stirring for 5 minutes the Cowles blade was replaced with an Impeller blade, and zircoa beads were then added. This mix was stirred at high speed for one hour, after which the beads were separated from the grind paste. The thickener (DSX-1514) was then added to the grind paste and stirred at high speed for five minutes, after which the grind paste was diluted with the let-down ingredients. The isocyanate portions of the Examples were prepared and added to the other ingredients as described below.

In Example A, the cationic isocyanate of Example 5 was first diluted with EXXATE 900 to 70 percent by weight of resin solids and then further diluted to 35 percent with deionized water. Because this isocyanate was self-dispersing, no emulsifier was required in this example. The diluted isocyanate was immediately stirred with moderate agitation into the container holding the remainder of the ingredients.

In Example B, 75 percent by weight DESMODUR N 3200 (at 100% resin solids) was blended with 25 percent by weight solids of the isocyanate emulsifier. This isocyanate package was stirred with moderate agitation into the container holding the remainder of the ingredients.

In Example C, 75 percent isophorone diisocyanate (100% solids) was blended with 25 percent of the isocyanate emulsifier (also at 100% solids). This isocyanate package was stirred with moderate agitation into the container holding the remainder of the ingredients.

In Example D, DESMODUR N 3400 (100% solids) was blended with SILQUEST Y-9669 (100% solids) at a ratio of 3 parts isocyanate to 1 part amine by equivalents. Then 25 percent by weight solids of the emulsifier was added. After a 24 hour induction, the isocyanate mixture was stirred with moderate agitation into the container holding the remainder of the ingredients.

Each of the coating formulations of Examples A, B, C and D was tested for performance by application onto a substrate prepared as follows. The substrates were 32 gauge steel panels with zinc phosphate pretreatment (available from Advanced Coating Technologies, Inc., Hillsdale, Mich.; as cold roll steel B952 P60 DIW, polish) primed with an epoxy-polyamide metal primer, DP-40/DP-401 (a metal primer made by mixing 1 volume DP-40 epoxy primer with 1 volume DP-401 epoxy primer catalyst, both available from PPG Industries, Inc., Pittsburgh, Pa.). The primed substrates were air-dried under ambient conditions for at least 1 hour before the example coatings were applied.

After at least a 24 hour induction period, each of the compositions of Examples A through D was applied by air-atomized spray at 45 pounds per square inch over the previously prepared substrates. Each coated substrate was air-dried under ambient conditions for 1 hour. Then each was dry-sanded with P400 grit sandpaper (P400-213Q, Imperial Wetordry® production paper, "A" weight, available from 3M, St. Paul, Minn.) immediately and, if necessary, at every succeeding hour interval. The time at which the example coating was observed to be sandable, i.e., when it did not foul the sandpaper, was taken to be the minimum required time after application until sandable.

Immediately after each spray application, the remaining portion of each example composition, approximately 85 to 100 grams, was sealed in a ½ pint container. Each sample container was stored at room temperature for one month, reopened, and observed for fluidity.

Evaluation of the adhesion of the coating of each example to the substrate was performed by applying masking tape (2 inch, "232 Masking Tape" available from 3M, St. Paul, Minn.) after a 1 hour dry time and then peeling it off. Additional adhesion testing was performed in accordance with method set forth in ASTM D3359, Method B, whereby the example coating was scribed with a Gardner Cross Cut Tester, Model P-A-T, fitted with a PA-2056 blade, both available from Gardco, Pompano Beach, Fla. The scribed coatings were subjected to tape pulling using Permacel 99 tape after the example coatings were dried and dried for 96 hours, and again after an additional 96 hours during which they were exposed to 100 degrees F. and 100% humidity.

The results of each of these performance tests are set forth in Table 1.

TABLE 1

| | EXAMPLE A | EXAMPLE B | EXAMPLE C | EXAMPLE D |
| --- | --- | --- | --- | --- |
| SANDING | | | | |
| 1 hour | Pass | Pass | Pass | Pass |
| 2 hour | N.A. | N.A. | N.A. | N.A. |
| 1 hour | N.A. | N.A. | N.A. | N.A. |
| ADHESION | | | | |
| 1 hour | Pass, 100% | Pass, 100% | Pass, 100% | Pass, 100% |
| 96 hours | Pass, 100% | Pass, 100% | Pass, 100% | Pass, 100% |
| 96 hr. plus 96 hr. humidity | Pass, 100% | Pass, 100% | Pass, 100% | Pass, 100% |
| FLUIDITY | | | | |
| 1 month | Pass | Pass | Pass | Pass |
| 2 months | Pass | Pass | Pass | Pass |

A "Pass" rating under SANDING indicates no fouling of the sandpaper due to embedding of coating in the grit.
N.A., or "not applicable" indicates no further testing was needed.
A "Pass" rating under ADHESION indicates greater than 95% adhesion of the example coating on the substrate (in this case, 100% for each of the Examples).
A "Pass" rating under FLUIDITY indicates an example coating that did not exhibit the characteristic of having unsprayable viscosity even when diluted with water.

The compositions of Examples A through D all met the objectives of rapid dry rate and stability as one package coatings. However, some of the examples have other characteristics that affect their attractiveness for commercial use. Example A exhibited excellent stability against gelling, but had less than optimal resistance to gas generation, and therefore is not a preferred embodiment for most applications. Example B is believed to be an anomalous result because its stability was not reproducible with any other composition that was made with an isocyanate having tri-functionality as in the DESMODUR N 3200 used there. The reason for the stability of Example B is not understood, but it is believed to be the result of the particular amino acrylate used. All other amino acrylates tried in the same combination resulted in unstable compositions that gelled. Example C exhibited excellent properties, demonstrating that di-functional isocyanates (such as isophorone diisocyanate) are preferable over tri-functional isocyanates in the present invention. However, use of isophorone diisocyanate in many commercial coating situations has environmental drawbacks. For environmental purposes, use of larger molecular weight isocyanates is preferred. Advantageously, Example D employs a larger molecular weight isocyanate, but avoids the gelation problem encountered with higher isocyanate functionality. Although Example D starts with a tri-functional isocyanate (DESMODUR N 3400) it is partially defunctionalized with an amine compound (SILQUEST Y-9669). An amino silane compound is used in order to provide the additional crosslinking capability of the silane group in Example D, but any amine compound could serve the purpose of defunctionalizing the excess isocyanate functionality. Instead of an amine, any compound containing a group that is reactive with isocyanate, such as a hydroxy group, could be used.

Although the invention has been described in detail for the purpose of illustrating the best mode of the invention, it is to be understood that such detail is solely for that purpose and that variations can be made by those skilled in the art without departing from the spirit and scope of the invention as defined by the claims.

What is claimed is:

1. A single-component coating composition that contains as the primary binder component a polyurea in an aqueous medium and that comprises the mixture of:

an aqueous polymeric dispersion comprising a amino polymer produced from olefinically unsaturated compounds and containing isocyanate-reactive groups selected from the group consisting of primary amino groups, secondary amino groups, or combinations thereof, wherein at least a portion of said amine groups are neutralized so as to disperse the polymer in water; and a polyisocyanate selected from the group consisting of polyisocyanates that are water dispersible, polyisocyanates that are water reducible, and polyisocyanates in combination with a nonionic surfactant, said polyisocyanate having an average functionality of no more than two isocyanate groups per molecule;

the polyisocyanate and amino polymer being proportioned to each other in an NCO/NH equivalent ratio of less than 1:1.

2. The coating composition of claim 1 wherein the NCO/NH equivalent ratio is at least 0.5:1.

3. The coating composition of claim 1 wherein the amino polymer is an acrylic polymer.

4. The coating composition of claim 1 wherein the amino polymer is a polyacrylate substantially free of hydroxyl functionality.

5. The coating composition of claim 1 wherein the amino polymer is a polyacrylate substantially free of acid functionality.

6. The coating composition of claim 2 wherein the amino group content of the polyacrylate of component (a) is 0.05 to 2.70 milliequivalents per gram.

7. The coating composition of claim 1 wherein the amino group content of the amino polymer is 0.25 to 1.62 milliequivalents per gram.

8. The coating composition of claim 3 wherein the amino polymer is the reaction product of monomers of which 1 to 50 percent by weight are amino group containing monomers.

9. The coating composition of claim 2 wherein the amino polymer is the reaction product of monomers of which 5 to 30 percent by weight are amino group containing monomers.

10. The coating composition of claim 1 wherein the functionality of the polyisocyanate has been reduced from higher than two isocyanate groups per molecule prior to mixing with the amino polymer.

11. The coating composition of claim 10 wherein the functionality of the polyisocyanate has been reduced by reaction with a compound containing an amine group or a hydroxyl group.

12. The coating composition of claim 11 wherein the compound used to reduce the isocyanate functionality additionally contains a silane group.

* * * * *